T. A. EDISON.
BUCKET CONVEYER.
APPLICATION FILED JUNE 14, 1907.

991,433.

Patented May 2, 1911.

Witnesses:
Frank D. Lewis
Anna R. Keehn

Inventor:
Thomas A. Edison
by
Frank L. Dyer
Atty.

UNITED STATES PATENT OFFICE.

THOMAS A. EDISON, OF LLEWELLYN PARK, ORANGE, NEW JERSEY.

BUCKET CONVEYER.

991,433.

Specification of Letters Patent.　　Patented May 2, 1911.

Application filed June 14, 1907. Serial No. 378,889.

*To all whom it may concern:*

Be it known that I, THOMAS ALVA EDISON, a citizen of the United States, residing at Llewellyn Park, Orange, county of Essex, and State of New Jersey, have invented certain new and useful Improvements in Bucket Conveyers, of which the following is a description.

My invention relates to improvements in bucket conveyers adapted particularly for the conveying of very gritty material, such as Portland cement. In using ordinary bucket conveyers in a cement mill, I find that the proper lubrication of the bearings of the supporting rollers presents enormous difficulty, since the dust works its way into the bearings and the oil is forced out, so as to rapidly destroy the same. Furthermore, in the case of a conveyer of considerable length, many hundred separate bearings for the supporting rollers require attention, and much time is wasted in that work since the filling of the individual oil-cups may require the stopping of the conveyer and consequently a good part of the mill. I aim therefore to make a bucket conveyer in which supporting rollers are dispensed with, and to this end the invention consists of a bucket conveyer in which the chains or ropes which carry the buckets are supported on shoes traveling over lubricated tracks. By keeping the tracks well oiled or greased, the conveyer can be operated with almost the same power as when supporting rollers are used, and the presence of dust or grit is not seriously objectionable, since the shoes tend to keep the tracks substantially clean, while the addition of the dust to the lubricant does not seriously interfere with its proper lubricating properties.

In order that the invention may be better understood, attention is directed to the accompanying drawing, forming part of this specification, and in which—

Figure 1:
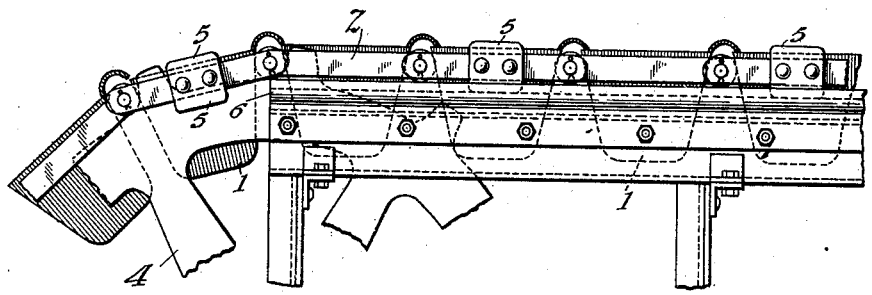
Figure 2:
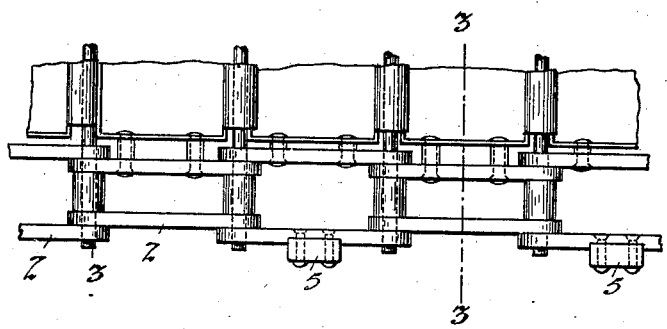
Figure 3:
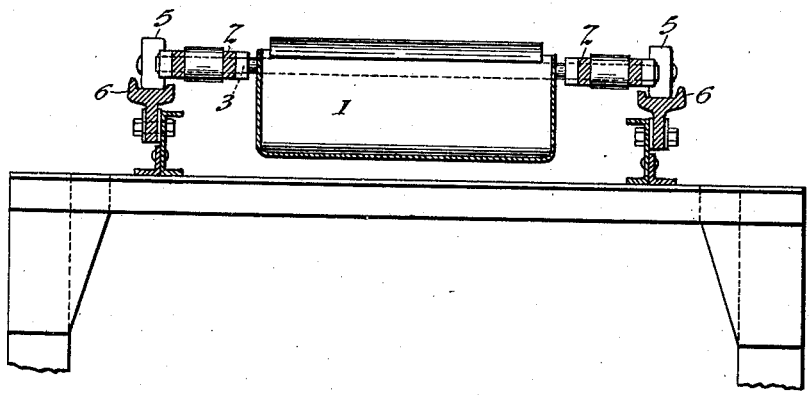

Figure 1, is a side view illustrating a portion of a bucket conveyer of the common type provided with my present improvements, the buckets being shown as supported on chains, but obviously other supports may be used; Fig. 2, a plan view of a bucket conveyer with a supporting chain and shoes at one side, and Fig. 3, a cross-sectional view on the line 3—3 of Fig. 2, illustrating the supporting chains.

In these views, corresponding parts are represented by the same numerals of reference.

The buckets 1 are shown as carried by the heavy chains 2, the links of which are connected by rods 3 in the usual way. The conveyer is driven by one or more sprocket wheels 4 engaging the side chains. Each chain is provided with wearing shoes 5, arranged at suitable distances apart and traveling on tracks 6, preferably formed with troughs in their upper faces, and in which a suitable supply of oil or grease may be maintained. When the conveyer is slightly inclined as is preferable, the oil may be introduced at the upper end of the tracks 6, so as to flow slowly down the same, but even when the conveyer is horizontal a comparatively few lubricating devices will be sufficient to properly supply the oil or grease which will be distributed throughout the length of the tracks by the movement of the supporting shoes.

Having now described my invention, what I claim as new and desire to secure by Letters Patent is as follows:

1. In a conveyer, the combination with the supporting chains, and means for driving the same, of a set of shoes carried by each chain on the side thereof, and midway of the links thereof, and a track for each set of shoes, substantially as set forth.

2. In a conveyer, the combination with the supporting chains, and means for driving the same, of a set of shoes carried by each chain on the side thereof, and a grooved track for each set of chains forming a runway for lubricant, substantially as and for the purposes set forth.

This specification signed and witnessed this 11th day of June 1907.

THOS. A. EDISON.

Witnesses:
  FRANK L. DYER,
  FRANK D. LEWIS.

Copies of this patent may be obtained for five cents each, by addressing the "Commissioner of Patents, Washington, D. C."